United States Patent [19]
Sirago et al.

[11] 3,713,779
[45] Jan. 30, 1973

[54] DISPOSABLE COMPARISON DETECTOR KIT

[75] Inventors: James J. Sirago, 910 Enterprise, Inglewood, Calif. 90302; Edward B. Walton, 3129 Yale Ave., Marina Del Rey, Calif. 90291

[22] Filed: Dec. 7, 1970

[21] Appl. No.: 95,765

[52] U.S. Cl. ............... 23/259, 23/230 B, 23/253 R, 23/253 TP, 206/47 A
[51] Int. Cl. ................. G01n 21/20, G01n 33/16
[58] Field of Search ....... 23/230 B, 253 TP, 259, 292; 206/47 A

[56] References Cited

UNITED STATES PATENTS

| | | | |
|---|---|---|---|
| 3,036,894 | 5/1962 | Forestiere | 23/253 TP |
| 3,381,572 | 5/1968 | Tuwiner | 23/253 TP |
| 3,446,596 | 5/1969 | Salivar et al. | 23/253 TP |
| 3,476,515 | 11/1969 | Johnson et al. | 23/253 X |
| 3,497,320 | 2/1970 | Blackburn et al. | 23/230 |
| 3,504,376 | 3/1970 | Bednar et al. | 23/230 |

*Primary Examiner*—Morris O. Wolk
*Assistant Examiner*—R. E. Serwin
*Attorney*—Beehler & Arant

[57] ABSTRACT

A sealed flexible plastic package contains ampuls of chemicals which are broken to release the contents and pass them through canals to a mixing pocket which contains a substance to be tested. The chemicals create a mixture having a certain characteristic color in the presence of an ingredient for which the test is conducted. For more accurate detection a small quantity of the mixture is passed into a smaller pocket preferably having a light colored bottom surface, and a color patch is placed near the smaller pocket for visual comparison with the color of the mixture.

9 Claims, 6 Drawing Figures

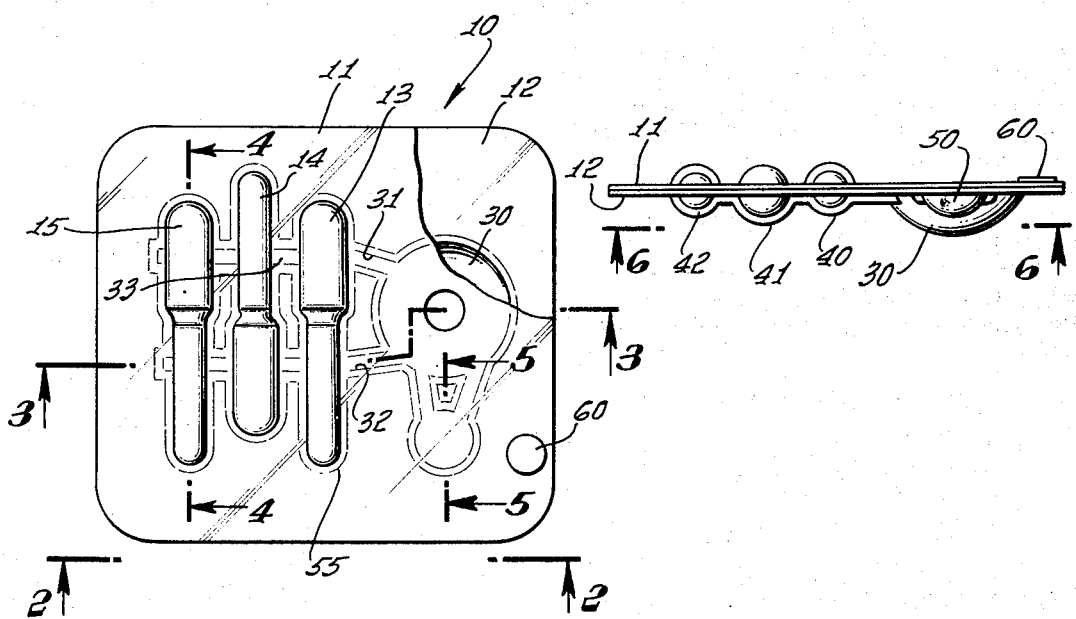

PATENTED JAN 30 1973

INVENTORS.
JAMES J. SIRAGO
EDWARD B. WALTON

By
Beehler, Arant & Jagger
ATTORNEYS.

DISPOSABLE COMPARISON DETECTOR KIT

Color comparison tests for detection of the presence of certain chemical ingredients frequently have been made use of as an accurate dependable test in the case of sundry ingredients such as barbiturates, Heroin, marijuana, narcotics and other sundry substances such as blood and urine. For the test to be dependable, the vessels containing the ingredients must be sterile and uncontaminated. Some attempt has been undertaken to provide packets, generally disposable in character, which contain a sufficient quantity of chemicals to make a single test of a selected sample sufficient for detection. Despite the workable character of some packets, recesses for positioning the sealed frangible ampuls of chemicals have been inappropriately located, mixing pockets have not been connected to the supply in a manner permitting well-controlled introduction of chemicals into the presence of the fluid to be tested and quantities provided for have not been such that an accurate dependable visual comparison can be quickly made.

It is therefore among the objects of the invention to provide a new and improved sealed flexible plastic package capable of carrying necessary detector chemicals for mixing to produce a mixture of characteristic color wherein passages capable of careful control are provided between the ampuls and the mixing pocket so that a well-controlled mix is possible.

Another object of the invention is to provide a new and improved sealed flexible plastic package capable of being used as a visual detector kit wherein there is provided a special comparison pocket into which a desired quantity of a mixture of chemicals and sample fluid can be passed so as to provide a a quantity of the mixture which can be accurately compared as to color characteristics with a color patch.

Still another object of the invention is to provide a new and improved sealed flexible plastic package compact in its design and also of such construction that it can readily accommodate one, two or more ampuls of chemicals arranged in such fashion that the ampul remains sealed after being broken, the package being such that all of the operations can be manipulated by hand without prospect of any leakage, the package being such that it is readily disposable after completion of the test.

With these and other objects in view, the invention consists in the construction, arrangement, and combination of the various parts of the device, whereby the objects contemplated are attained, as hereinafter set forth, pointed out in the appended claims and illustrated in the accompanying drawings.

In the drawings:

FIG. 1 is a plan view of a typical package partially broken away showing three frangible ampuls in position.

FIG. 2 is a side elevational view on the line 2—2 of FIG. 1.

FIG. 3 is a sectional view on the line 3—3 of FIG. 1.

FIG. 4 is a sectional view on the line 4—4 of FIG. 1.

FIG. 5 is a fragmentary sectional view on the line 5—5 of FIG. 1.

FIG. 6 is a bottom view, on line 6—6 of FIG. 2.

In an embodiment of the invention chosen for the purpose of illustration, there is shown a sealed flexible plastic package generally indicated by the reference character 10 consisting of a top sheet 11 and a bottom sheet 12. The top and bottom sheets are constructed from synthetic plastic resin material of inert character unaffected by the variety of chemicals sought to be handled.

The package is adapted to accommodate a series of ampuls 13, 14 and 15 substantially identical in physical form, but each adapted to contain a liquid 16, 16' and 16'' of some specific nature. Such ampuls, commercially available, are customarily made of relatively thin glass having one relatively large cylindrical end 17, a relatively smaller tapered end 18 and an annular recessed intermediate portion 19 interconnecting the two ends. The intermediate portion provides a weakened wall so that the ampul can be broken readily at the weakened portion to release the liquid contents.

To accommodate the ampuls, the bottom sheet 12 is provided with three elongated recesses 20, 21 and 22 slightly larger than a one-half section of the respective ampul. Complementary recesses 23, 24 and 25 are provided in the top sheet 11 so that when the respective complementary recesses are brought together in the manner shown the combined recessed chamber thus provided comfortably accommodates the ampul in each instance.

In the bottom sheet 12 at the location on one side of the individual recesses thus described is a mixing pocket 30. Interconnecting the combined recesses 20 and 23, for example, and the mixing pocket 30 are canals 31 and 32, one serving as an inflow canal and the other serving as a vent.

Of special significance are the arcuate enlargements 37, 38 and 39 surrounding the recesses 20, 21 and 22; and in line with the canals 31, 32 and 33. Enlargements 40, 41 and 42 surrounding the same recesses 20, 21 and 22 are of comparable significance. Presence of the enlargements assures that there will be no restriction to the free flow of liquid from the ampuls when broken, to the mixing pocket and likewise no restriction to venting air or gas from the mixing pocket back to the recesses.

Adjacent the mixing pocket 30 is a secondary relatively smaller pocket 50, likewise being formed in the bottom sheet, and canals 51 and 52 interconnect the secondary pocket 50 with the mixing pocket 30, the canals being formed entirely in the bottom sheet 12. The top and bottom sheets are sealed together throughout an area 53 throughout the perimeter, there being additionally provided a sealing band 54 surrounding the rims of the pockets 30 and 50 and a similar sealing band 55 surrounding the combined recesses which contain the ampuls, the sealing bands 43 and 44 being joined together at the margins of the canals so that there is a double seal in effect surrounding all of the liquid containing spaces.

When the packet is to be used to perform a test, a sample of suspected material is inserted into the mixing pocket through an opening 56 in the top sheet 11. After this has been accomplished a sealing patch 57 provided with a conventional pressure-sensitive seal is removed from its handy location and applied over the opening 56 to completely and effectively seal the opening.

The package is then flexed, first to break one of the anpuls and then, successively, the other two. When an ampul is broken, the fracture takes place at the intermediate portion 19 of reduced diameter, and the liquid 16, 16' and 16'' as the case may be is then freed for passage through one or another of the lines of canals into the mixing pocket 30 while air or gas in the pocket is vented through the other line of canals.

When the liquid contents have thus been passed into the mixing pocket, the package can be shaken to thoroughly mix the chemicals with the sample until a desired uniform color characteristic has been attained. A quantity of the mix thus provided is then passed through either the canal 31 or 32 into the secondary pocket 50 and air from the pocket vented through the opposite canal.

At the side of the pocket 50 is a color comparison patch 60, of a color designed to be matched by the color of the mixture provided that the substance for which the test is designed is the correct substance. If the color of the mixture matches the color patch under the circumstances described, it is a reliable indication that the substance for which the test is conducted is the correct substance. Should the colors not match, then it can be concluded that the substance is not that sought and a packet containing different chemicals can be employed for a second test. Inasmuch as the package is sealed completely during all portions of the test, upon completion the entire packet can be disposed of without being broken.

Also it is found advantageous to provide the bottom sheet 12 containing the pockets with a color coating, preferably white, either on the inside, the outside or having the entire bottom sheet impregnated, thus making the handling and blending of the chemicals easier to see.

Although the recesses have been described as being made partially in each of the top and bottom sheets, it will be understood that, if preferred, one only of the sheets can be depressed at the area of the recesses a sufficient amount to contain the entire circumference of the ampul, thereby permitting the second sheet to be non-deformed. If preferred, the sheets can be otherwise formed so that not only are portions of the recesses formed in both sheets, but portions of the pockets may likewise be formed in both sheets.

While the invention has herein been shown and described in what is conceived to be a practical and effective embodiment, it is recognized that departures may be made therefrom within the scope of the invention, which is not to be limited to the details disclosed herein but is to be accorded the full scope of the claims so as to embrace any and all equivalent devices.

Having described the invention, what is claimed as new in support of Letters Patent is:

1. A detector kit for identification of the presence of chemicals in solution by visual color comparison comprising matching sheets of flexible and initially deformable material and at least one ampul containing a liquid chemical of predetermined volume, said ampul having opposite end chambers and a frangible section intermediate said end chambers, one of said sheets having therein a retention recess of shape and size accommodating said ampul, there being an area of said sheet adjacent said recess, means laterally spaced from said recess forming a mixing pocket in said area having a port thereto from the exterior for introduction of sample material to be tested, a first canal means respectively interconnecting one portion of said recess with said pocket, said pocket having a volume in excess of the volume of the contents of said ampul, a secondary pocket smaller than the mixing pocket, a second canal means interconnecting said mixing pocket and another portion of said secondary pocket, one of said canal means comprising a supply conduit to the pocket and the other of said canal means comprising a vent conduit therefrom, and a color comparison patch on one of said sheets adjacent said secondary pocket.

2. A detector kit as in claim 1 wherein there is a plurality of parallel laterally spaced recesses for a plurality of ampuls and continuations of said canal means interconnecting all of said recesses.

3. A detector kit as in claim 2 wherein there are enlargements extending transversely around said recesses in line respectively with each portion of said canal means.

4. A detector kit according to claim 1 wherein said secondary pocket is spaced from said mixing pocket and there are separate portions of said canal means interconnecting said pockets.

5. A detector kit according to claim 2 wherein said canal means comprises two lines of depressions in the sheet of material containing said recesses forming said canals, one of said lines being for supplying fluid respectively to the mixing pocket and to the secondary pocket, the other of said lines of canals being for venting.

6. A detector kit according to claim 1 wherein there is a substantially opaque light colored surface at the bottom of said secondary pocket.

7. A detector kit according to claim 1 wherein there are three recesses in laterally spaced parallel relationship on one side only of the mixing pocket.

8. A detector kit according to claim 1 wherein portions of said kit forming said recesses are in both of said sheets.

9. A detector kit according to claim 1 wherein the ampul has an elongated body with an intermediate section separating the ampul into opposite elongated end sections, said intermediate sections being smaller in cross sectional area than the cross sectional areas of the end sections and wherein at least one of the sheets follows the contour of the ampul throughout its length.

* * * * *